US011162635B2

(12) United States Patent
Thompson

(10) Patent No.: US 11,162,635 B2
(45) Date of Patent: Nov. 2, 2021

(54) UNIVERSAL DECK MOUNT SYSTEM AND METHOD FOR USE THEREOF

(71) Applicant: Richard Thompson, Wooler (CA)

(72) Inventor: Richard Thompson, Wooler (CA)

( * ) Notice: Subject to any disclaimer, the term of this patent is extended or adjusted under 35 U.S.C. 154(b) by 87 days.

(21) Appl. No.: 16/580,295

(22) Filed: Sep. 24, 2019

(65) Prior Publication Data

US 2021/0088180 A1 Mar. 25, 2021

(51) Int. Cl.
*F16M 13/02* (2006.01)
*F16B 2/06* (2006.01)
*A47B 91/08* (2006.01)
*A45B 23/00* (2006.01)
*E04H 12/22* (2006.01)
*E04B 1/00* (2006.01)

(52) U.S. Cl.
CPC ........... *F16M 13/022* (2013.01); *A45B 23/00* (2013.01); *A47B 91/08* (2013.01); *E04H 12/22* (2013.01); *F16B 2/065* (2013.01); *E04B 1/003* (2013.01)

(58) Field of Classification Search
CPC ....... F16M 13/022; A45B 23/00; F16B 2/065; A47B 91/08; E04H 12/22; E04B 1/003
USPC .................................................. 248/534, 201
See application file for complete search history.

(56) References Cited

U.S. PATENT DOCUMENTS

| 4,582,287 | A | | 4/1986 | Deleary | |
|---|---|---|---|---|---|
| 5,685,517 | A | | 11/1997 | Salibra | |
| 5,687,515 | A | * | 11/1997 | Rodrigues | E04H 13/003 40/124.5 |
| 5,822,918 | A | * | 10/1998 | Helfman | A47H 27/00 47/39 |
| 7,156,357 | B1 | | 1/2007 | Kocur | |
| 7,575,215 | B1 | | 8/2009 | Clark et al. | |
| 7,780,139 | B2 | | 8/2010 | Markert | |
| 8,839,588 | B2 | | 9/2014 | Philbin et al. | |
| 9,493,962 | B2 | | 11/2016 | Eddy | |
| 10,021,999 | B1 | * | 7/2018 | Khan | A47G 7/06 |
| 10,513,849 | B1 | * | 12/2019 | Pearson | E04C 3/06 |
| 2012/0060443 | A1 | * | 3/2012 | Vernon | E04C 3/29 52/834 |
| 2013/0112822 | A1 | * | 5/2013 | Ishiwata | G03G 21/1619 248/188.8 |
| 2019/0277022 | A1 | * | 9/2019 | Francis | E04B 1/003 |

FOREIGN PATENT DOCUMENTS

| DK | 201400329 A1 | 1/2016 |
|---|---|---|
| FR | 2754438 A1 | 4/1998 |
| WO | 2011112142 A1 | 9/2011 |

* cited by examiner

*Primary Examiner* — Muhammad Ijaz

(57) ABSTRACT

A deck mount system and method is provided that can be installed and relocated easily without damaging the deck. The deck mount system comprises a top bracket with a top bracket plate and top bracket sides for flanking a deck member, a bottom bracket including a bottom bracket plate and bottom bracket sides for overlapping the top bracket sides, and at least one fastener to reversibly attach the top bracket to the bottom bracket for securing the deck mount system to the deck member. The method for attaching the deck mount system comprises placing a deck mount top bracket over a deck member, placing a deck mount bottom bracket under the deck member, and attaching the top bracket to the bottom bracket using at least one fastener, thereby reversibly fixing the top bracket to the bottom bracket around the deck member.

11 Claims, 5 Drawing Sheets

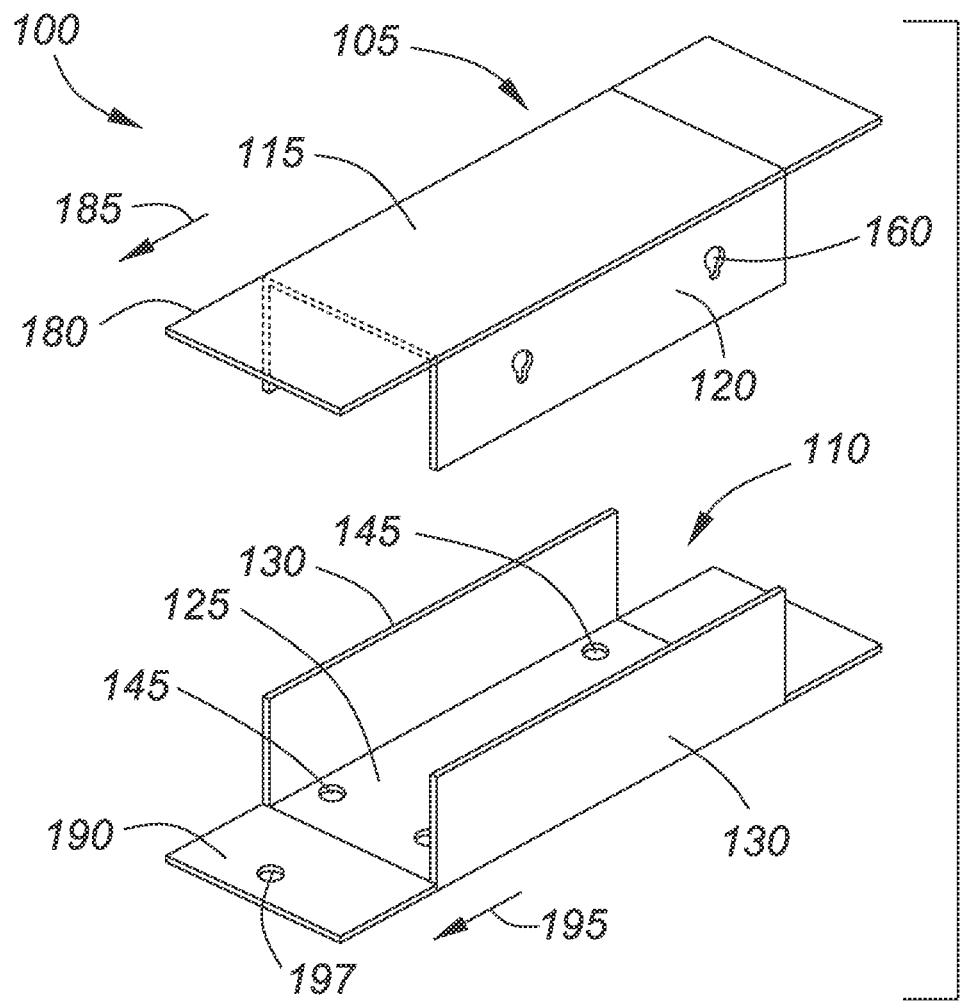
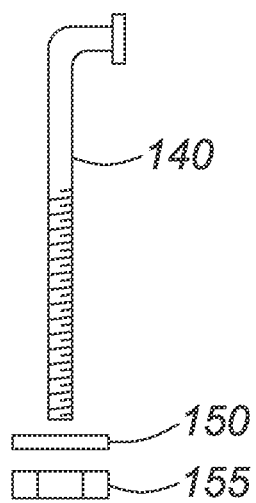
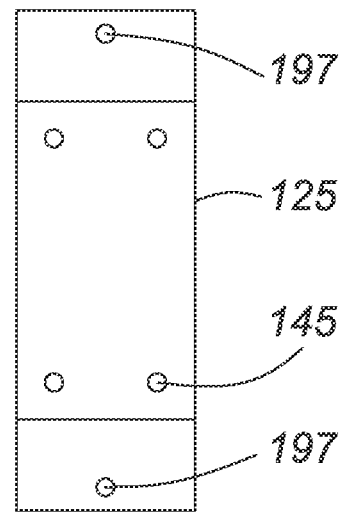
FIG. 1A
FIG. 1B
FIG. 1C

UNIVERSAL DECK MOUNT SYSTEM AND METHOD FOR USE THEREOF

TECHNICAL FIELD

The present disclosure relates generally to a mounting system and more specifically to a deck mount system and a method for using the deck mount system.

BACKGROUND

Outdoor deck accessories such as umbrellas, tables or gazebos, are frequently fixed to decks, terraces or other outdoor places for stability. The attachment means may employ drilling holes into the deck to fasten the accessory or using weighted bases such as concrete or plastic holders filled with water or sand. These attachment means have several drawbacks. Permanent attachment using drilled holes and screws damages the deck and makes removal and relocation difficult. Weighted bases are difficult and clumsy to move, and it is time-consuming to fill and empty a base with sand or water. Further, each attachment means is useful only for a specific type of deck accessory. Weighted bases are typically used for deck umbrellas and drilling and screwing in accessories is typically used for structural features such as gazebos or tables and benches. Thus, there is a need for a deck mount system that is easy to mount and relocate without damaging the deck and can be used for a variety of deck accessories.

SUMMARY

In the present disclosure, there is described a universal deck mount system that can be installed and relocated easily without damaging deck boards.

In a first aspect of the present invention, there is provided a deck mount system comprising a top bracket including a top bracket plate and a respective first and second top bracket side each extending perpendicularly from the top bracket plate for flanking a deck member, a bottom bracket including a bottom bracket plate and a respective first and second bottom bracket side each extending perpendicularly from the bottom bracket plate for overlapping the first and second top bracket sides; and at least one fastener to reversibly attach the top bracket to the bottom bracket for securing the deck mount system to the deck member.

In a further aspect of the present invention, there is provided a method for attaching a deck mount to a deck comprising placing a deck mount top bracket over a deck member, the top bracket having a top bracket plate and a respective first and second top bracket side each extending perpendicularly from the top bracket plate, such that the top bracket sides flank the deck member, placing a deck mount bottom bracket under the deck member, the bottom bracket having a bottom bracket plate and a respective first and second bottom bracket side extending perpendicularly from the bottom bracket plate, such that the bottom bracket sides overlap the top bracket sides; and attaching the top bracket to the bottom bracket using at least one fastener, thereby reversibly fixing the top bracket to the bottom bracket around the deck member.

A more complete understanding of the can be obtained by reference to the following detailed description in connection with the attached drawings.

BRIEF DESCRIPTION OF THE DRAWINGS

FIG. 1A is a perspective view of a top bracket and bottom bracket of an embodiment of the deck mount system.

FIG. 1B is a side plan view of a fastening bolt for the deck mount system illustrated in FIG. 1A.

FIG. 1C is a top plan view of the bottom bracket illustrated in FIG. 1A.

Figure 2:
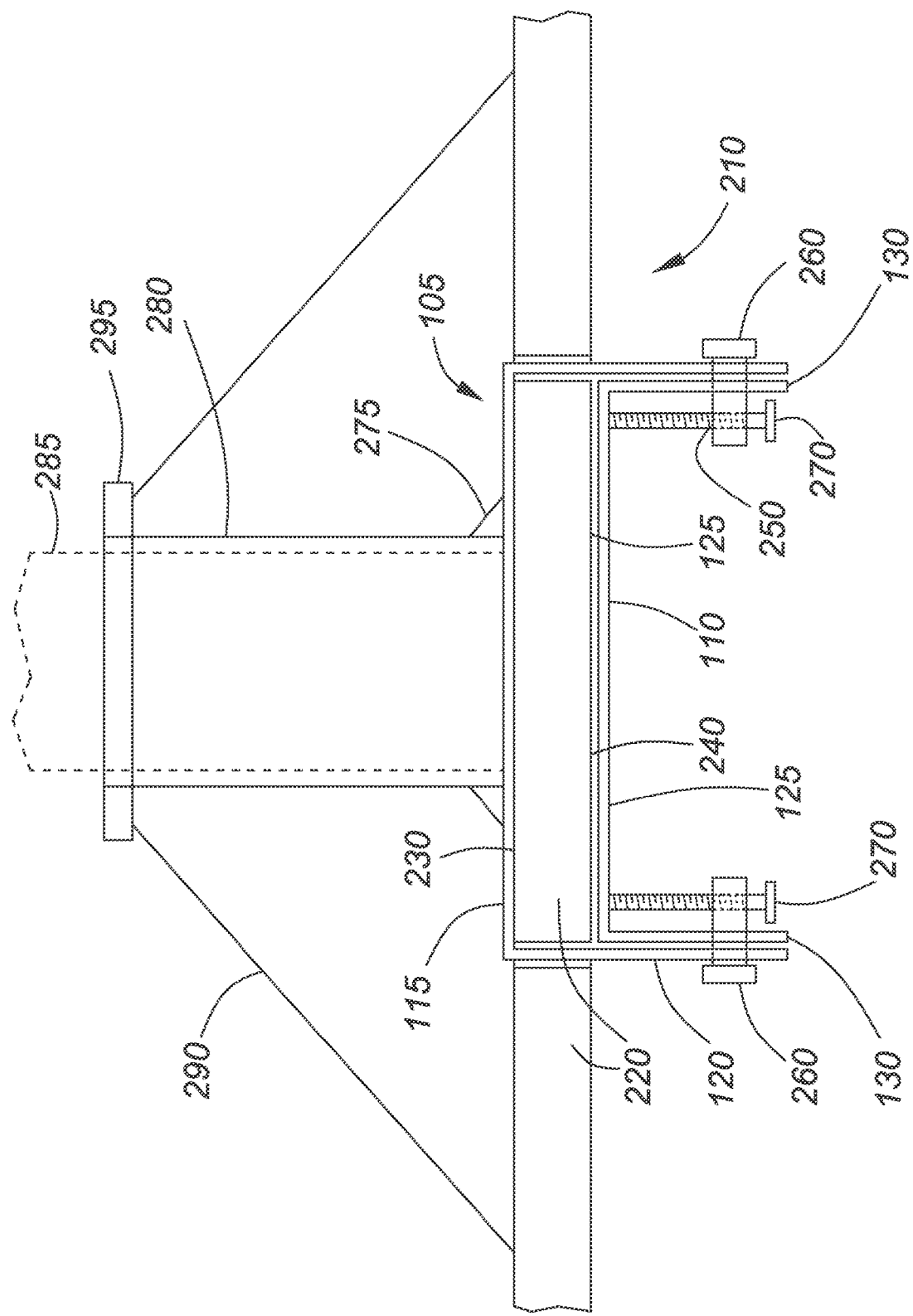
FIG. 2 is a front plan view of a further embodiment of the deck mount system with a base mount for an umbrella and a decorative base, fastened to a deck.

The drawings presented herein are presented for convenience to explain the functions of the elements included in the described embodiments of the deck mount system. Elements and details that are obvious to the person skilled in the art may not have been illustrated. Conceptual sketches have been used to illustrate elements that would be readily understood in the light of the present disclosure. Some details have been exaggerated for clarity. These drawings are not fabrication drawings and should not be scaled.

DETAILED DESCRIPTION

The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

The following description refers to a universal deck mount system. It will be understood by those skilled in the art that the disclosure provided may be applied to a mount system for attaching items to a structure that includes a rectangular member, such as a wooden board or metal plank of a deck. The deck mount system provides a secure mount to a deck without damage to deck boards and can be installed and relocated easily. It is simple to install and does not require drilling holes in the deck nor weight to support. The mount slides down between deck boards and a plate is installed below the deck that pulls and anchors the bracket to the deck board from the underside.

An embodiment of the present disclosure is presented in FIG. 1A. A deck mount 100 has a top bracket 105 and a bottom bracket 110. The top bracket 105 includes a top bracket plate 115 and top bracket sides 120, each top bracket side extending approximately perpendicularly from the top bracket plate. The bottom bracket 110 includes a bottom bracket plate 125 and bottom bracket sides 130, each bottom bracket side extending approximately perpendicularly from the bottom bracket plate.

As illustrated in FIG. 2, for mounting to a deck structure 210 with deck members 220, for example deck boards, the top and bottom bracket plates 115, 125 and sides 120, 130 form a top and bottom bracket 105, 110 that flanks a deck board 220, thus providing a close fit and stability to the deck mount 100. The top and bottom bracket 105, 110 are mounted on the upper and lower face 230, 240, respectively, of the deck board 220, such that the top and bottom brackets flank the deck board and the top bracket sides 120 overlap with the bottom bracket sides 130. A fastener 250 attaches the top bracket 105 to the bottom bracket 110, thereby securing the top and bottom bracket to the deck member 220.

As illustrated in FIGS. 1B and 1C, an example of a fastener for the deck mount system is a bolt with a 90 degree bend 140, that passes through a top bracket side 120 and down through the receiving holes 145 in the bottom bracket plate 125. The bolt 140 is tightened using for example a washer 150 and wing nut 155 on the underside of the bottom bracket plate 125. To further provide a tight fit around the deck member as the bolt is tightened, the bolt may be passed through a skeleton key opening 160 in the top bracket side 120.

As illustrated in FIG. 2, another example of a fastener for the deck mount 100 is a clamping bolt 260 passing through the sides of the top and bottom bracket 120, 130 and an adjusting bolt 270 passing through the clamping bolt to tighten the top and bottom bracket plates 115, 125 against the deck board 140.

Figure 3:
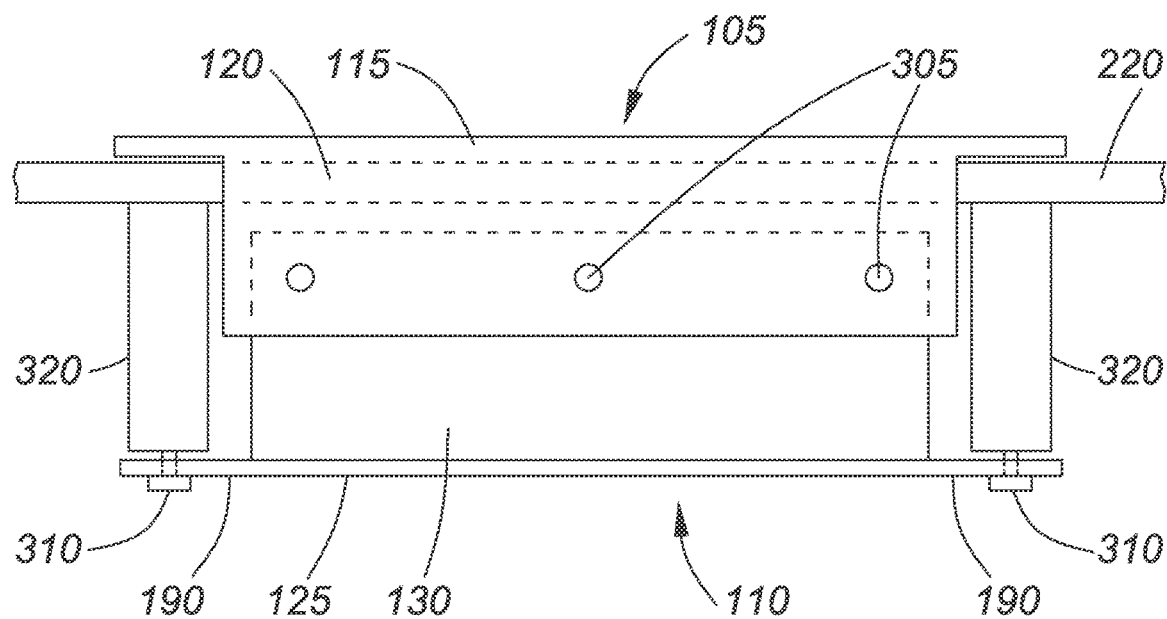
FIG. 3 is a side plan view of an embodiment of the deck mount system fastened to a deck.

As illustrated in FIG. 3, a further example of a fastener for the deck mount system is a transverse bolt 305 passing through a top bracket side 120 and an adjacent bottom bracket side 130, thus securing the top and bottom bracket 105, 110 in a secure position flanking the deck member 220.

Returning to FIG. 1, in a further embodiment, the top bracket 105 may include a top bracket flange 180 extending from the top bracket plate, to further stabilize the deck mount on the deck. The top bracket flange 180 may extend from the top bracket plate in a parallel direction 185 to the length of the top bracket sides. Alternatively, as illustrated in FIG. 4, the top bracket flange 180 may extend from the top bracket plate in a perpendicular direction 410 to the length of the top bracket sides 120, or a top bracket flange 180 may extend in each direction 185, 410.

Returning again to FIG. 1, in a further embodiment, the bottom bracket 110 may include a bottom bracket flange 190 extending from the bottom bracket plate, to further stabilize the deck mount on the deck. The bottom bracket flange may extend from the bottom bracket plate in a direction parallel to the length of the bottom bracket sides 195, or may extend in a direction perpendicular to the length of the bottom bracket sides (not shown). The bottom bracket flange may be fastened to the deck, for example using lag bolts through an opening 197 in the bottom bracket flange. As illustrated in FIG. 3, lag bolts 310 may attach the bottom bracket flange 190 to a deck joist under the deck boards 220 to provide greater stability to the deck mount 100 and support to attached deck accessories.

Figure 4:
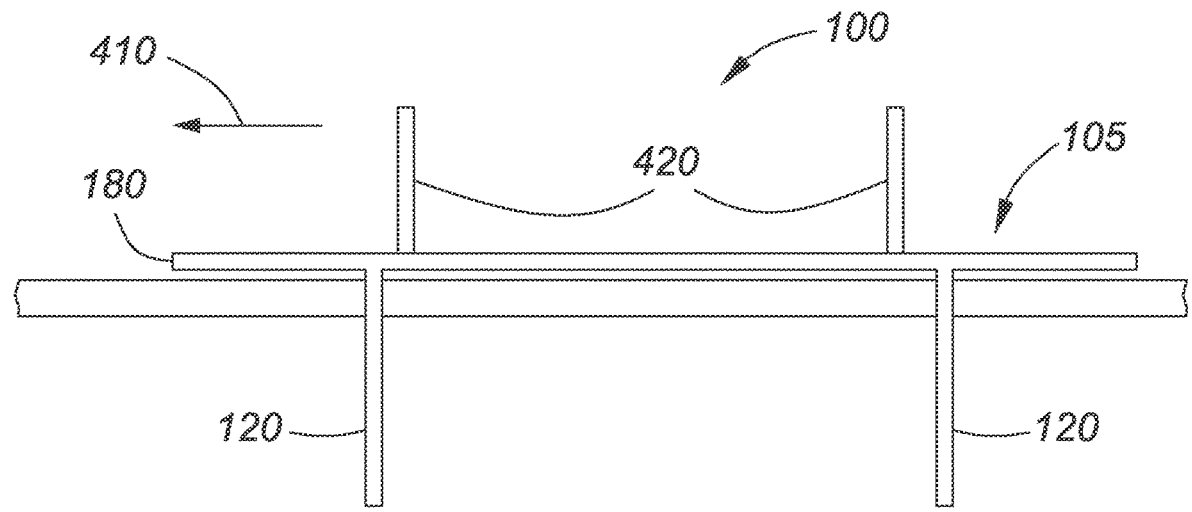
FIG. 4 is a front plan view further embodiment of a top bracket of the deck mount system arranged on a deck member.
Figure 5:
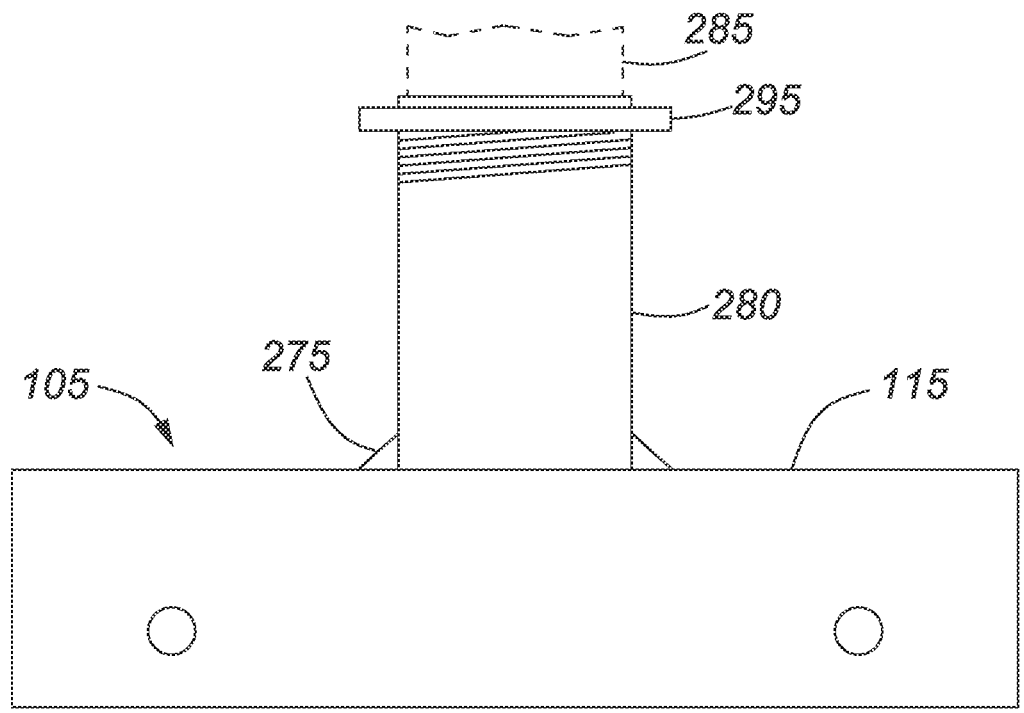
FIG. 5 is a side plan view of the embodiment of the deck mount system shown in FIG. 2.
Figure 6:
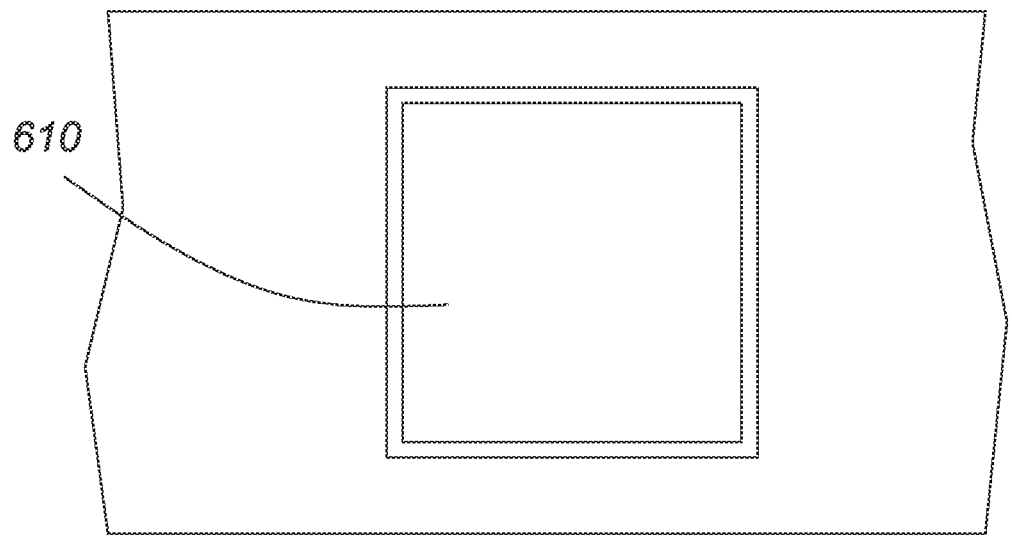
FIG. 6 is a top plan view of a deck mount with an adaptor to secure a gazebo post.

As illustrated in FIG. 4, the deck mount 100 may attach deck accessories using an adaptor or base mount 420 attached to the top bracket 105. Deck accessories include, for example, an umbrella, table, chair, gazebo, flag pole, or post. As further illustrated in FIG. 2 and FIG. 5, the base mount may be adapted to fit the accessory, for example the base mount may include a hollow cylinder 280 extending upwards from the top bracket plate 115, to hold an umbrella mast 285. The umbrella mast 285 is secured in the hollow cylinder 280, for example with a locking pin (not shown). The base mount, in this example the hollow cylinder 280, may be joined to the top bracket 105 with a welded joint 275. The base mount 420 may also include a decorative base 290, which can be secured with a threaded locking collar 295. The adaptor 420 may alternatively be an angle bracket to fasten metal frame work or, as illustrated in FIG. 6, a square metal frame 610 of a suitable size to secure a post, such as a 4 inch by 4 inch or 6 inch by 6 inch post for a gazebo.

Figure 7:
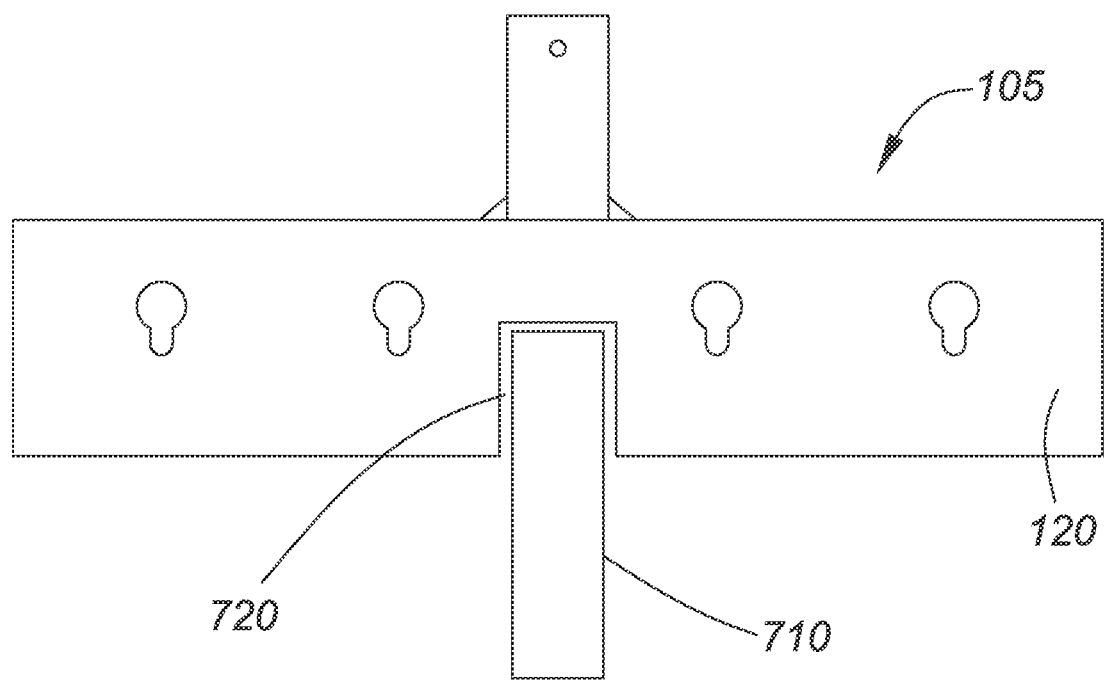
FIG. 7 is a side plan view of a further embodiment of the deck mount system with a cut-away in the top bracket side to accommodate a deck joist.

In a further embodiment illustrated in FIG. 7, the deck mount may flank a deck joist 710 by including a cut-away 720 in the top bracket side 120 to allow the top bracket sides to extend past the deck joist.

The deck mount system can be constructed of material such as stainless steel or coated metal for strength and to withstand outdoor weather.

Returning to FIG. 2, the deck mount 100 is used by placing the deck mount top bracket 105 over a deck member 220, such as a deck board, so that the top bracket plate 115 lies against the deck member upper side 220 and the top bracket sides 120 flank the deck member 220. The deck mount bottom bracket 110 is placed under the deck member 220, so that the bottom bracket plate 125 lies against the deck member underside 240 and the bottom bracket sides 130 overlap the top bracket sides 120. The top bracket 105 is attached to the bottom bracket 110 with a fastener 250 to fix the top bracket to the bottom bracket around the deck member 220 to secure the deck mount 100 in place.

The bottom bracket sides 130 can be arranged so they lie inside or outside the top bracket sides 120. Further, the bottom bracket sides 130 may be placed such that they extend upwards towards the top bracket plate 115, as illustrated in FIG. 3. This arrangement of the bottom bracket sides is useful to accommodate and attach a deck joist 320. Alternatively, as illustrated in FIG. 2, the bottom bracket sides 130 may extend downwards away from the top bracket plate 115, so the top bracket sides 120 flank the deckboard 220 and the bottom bracket sides 130 are adjacent to the top bracket sides.

As further illustrated in FIG. 3, the top bracket 105 may be attached to the bottom bracket 110 by fastening a transverse bolt 305 through a top bracket side 120 and adjacent bottom bracket side 130. In a further embodiment, the bottom bracket 110 may be attached to a deck joist 320 with a lag bolt 310 passing through a bottom bracket flange 190 extending from the bottom bracket plate 125.

In an alternate embodiment shown in FIG. 1, the top bracket 105 is attached to the bottom bracket 110 by fastening a bolt 140 with an approximately 90 degree bend through the top bracket side 120 and a hole 145 in the bottom bracket plate 125. In a further embodiment, the bolt 140 may be passed through a skeleton key opening 160 in the top bracket side 120, so that as the bolt is tightened, it is further secured in the narrow aspect of the skeleton key opening.

In a further embodiment, deck accessories are attached to the deck mount 100 through a base mount 420 fixed to the top bracket 105. For example, as illustrated in FIGS. 2 and 5, an umbrella may be attached to the deck mount by placing an umbrella mast 285 in a hollow cylinder base mount 280 attached to the top bracket plate 115 and securing the umbrella with a locking pin (not shown).

FIG. 6 illustrates a further embodiment of the present invention, wherein a gazebo is mounted to a deck with the deck mount 100 using a base mount 610 that is a hollow square mount to secure a gazebo post.

FIG. 7 illustrates a further embodiment, wherein the deck mount 100 is placed so that it extends on either side of a deck joist 710, by placing the top bracket 105 with a cut-away 720 in the top bracket side 120 over a deck board (not shown) on either side of a deck joist 710.

While embodiments of the deck mount system have been illustrated in the accompanying drawings and described herein above, it will be appreciated by those skilled in the art that various modifications, alternate constructions and equivalents may be employed. It should be further understood that the claims are not intended to be limited to the particular forms disclosed, but rather to cover all modifications, equivalents, and alternatives falling within the spirit and scope of this disclosure.

Therefore, the above description and illustrations should not be construed as limiting the scope of the invention, which is defined in the appended claims.

What is claimed is:

1. A deck mount system comprising:
   a top bracket including a top bracket plate and a respective first and second top bracket side each extending perpendicularly from the top bracket plate for flanking a deck member;
   a bottom bracket including a bottom bracket plate and a respective first and second bottom bracket side each extending perpendicularly from the bottom bracket plate for overlapping the first and second top bracket sides; and
   at least one fastener to reversibly attach the top bracket to the bottom bracket for securing the deck mount system to the deck member;
   wherein the fastener comprises a bolt passing through a skeleton key opening in the top bracket first side and extending through the bottom bracket plate.

2. The deck mount system of claim 1, wherein the fastener comprises a bolt passing through the bottom bracket first side and the top bracket first side.

3. The deck mount system of claim 1, wherein the top bracket further comprises a top bracket flange extending from the top bracket plate, for stabilizing the top bracket.

4. The deck mount system of claim 3, wherein the top bracket flange extends in a parallel direction to the first and second top bracket sides for stabilizing the top bracket on the deck member.

5. The deck mount system of claim 3, wherein the top bracket flange extends from the top bracket plate in a perpendicular direction to the first and second top bracket sides for stabilizing the top bracket on an adjacent deck member.

6. The deck mount system of claim 1, wherein the bottom bracket further comprises a bottom bracket flange extending from the bottom bracket plate.

7. The deck mount system of claim 6, further comprising deck fasteners for attaching the bottom bracket to the deck member through the bottom bracket flange.

8. The deck mount system of claim 1, further comprising a base mount fixedly attached to the top bracket for attaching an accessory.

9. The deck mount system of claim 8, wherein the accessory comprises one or more of: an umbrella; a table; a chair; a gazebo; a flag pole; and a post.

10. The deck mount system of claim 8, wherein the base mount comprises an angle bracket to fasten metal frame work.

11. The deck mount system of claim 1, wherein the top bracket sides include a cut-away for flanking a deck joist.

* * * * *